United States Patent
Ishii

(10) Patent No.: US 9,054,596 B2
(45) Date of Patent: *Jun. 9, 2015

(54) DEVICE FOR SYNCHRONOUS DC-DC CONVERSION AND SYNCHRONOUS DC-DC CONVERTER

(71) Applicant: PANASONIC CORPORATION, Osaka (JP)

(72) Inventor: Takuya Ishii, Osaka (JP)

(73) Assignee: PANASONIC CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/063,857

(22) Filed: Oct. 25, 2013

(65) Prior Publication Data
US 2014/0049994 A1 Feb. 20, 2014

Related U.S. Application Data

(62) Division of application No. 13/243,164, filed on Sep. 23, 2011, now Pat. No. 8,669,748.

(30) Foreign Application Priority Data

Oct. 18, 2010 (JP) ................. 2010-233406

(51) Int. Cl.
  *H02M 1/36* (2007.01)
  *H02M 3/158* (2006.01)
  *G05F 1/00* (2006.01)
(52) U.S. Cl.
  CPC .............. *H02M 1/36* (2013.01); *H02M 3/1588* (2013.01); *Y02B 70/1466* (2013.01)
(58) Field of Classification Search
  CPC .......... H02M 1/32; H02M 1/36; H02M 3/157

USPC ......... 323/222–225, 271–275, 282–285, 901, 323/908
See application file for complete search history.

(56) References Cited

U.S. PATENT DOCUMENTS 5,481,178 A * 1/1996 Wilcox et al. ................. 323/287
6,091,234 A * 7/2000 Kitagawa ..................... 323/244
(Continued)

FOREIGN PATENT DOCUMENTS

| JP | 11-220874 | 8/1999 |
| JP | 2003-070238 A | 3/2003 |
| JP | 2008109747 A * | 5/2008 |

OTHER PUBLICATIONS

Notice of Allowance issued in U.S. Appl. No. 13/243,164 dated Nov. 15, 2013.
(Continued)

*Primary Examiner* — Timothy J Dole
*Assistant Examiner* — Yusef Ahmed
(74) *Attorney, Agent, or Firm* — McDermott Will & Emery LLP

(57) ABSTRACT

A DC-DC converter transforms a DC input voltage to generate a DC output voltage by complementary switching control of a main switching transistor and a synchronous rectifying transistor. The DC-DC converter includes a soft-start circuit configured to generate a soft-start voltage rising from an initial voltage at start-up of the DC-DC converter; and a control circuit configured to control switching of the main switching transistor and the synchronous rectifying transistor based on the soft-start voltage to perform soft start of the DC-DC converter. The control circuit brings both of the main switching transistor and the synchronous rectifying transistor to an off state while the soft-start voltage is lower than the DC output voltage.

25 Claims, 13 Drawing Sheets

(56) References Cited

U.S. PATENT DOCUMENTS

| | | | |
|---|---|---|---|
| 6,430,070 B1* | 8/2002 | Shi et al. | 363/97 |
| 7,045,992 B1* | 5/2006 | Silva et al. | 323/222 |
| 7,106,036 B1 | 9/2006 | Collins | |
| 7,180,757 B2* | 2/2007 | Chen et al. | 363/49 |
| 7,362,595 B2* | 4/2008 | Noma | 363/59 |
| 7,598,715 B1* | 10/2009 | Hariman et al. | 323/271 |
| 7,782,024 B2* | 8/2010 | Fukushi et al. | 323/224 |
| 7,859,233 B1* | 12/2010 | Silva et al. | 323/222 |
| 7,868,595 B1* | 1/2011 | Smith | 323/222 |
| 7,868,602 B2* | 1/2011 | Omi et al. | 323/284 |
| 2003/0042880 A1 | 3/2003 | Kataoka | |
| 2004/0232899 A1* | 11/2004 | Herbert | 323/282 |
| 2005/0110469 A1* | 5/2005 | Inaba et al. | 323/222 |
| 2006/0220629 A1* | 10/2006 | Saito et al. | 323/282 |
| 2006/0220631 A1* | 10/2006 | Ito | 323/283 |
| 2007/0182396 A1* | 8/2007 | Inatomi | 323/283 |
| 2007/0296386 A1* | 12/2007 | Umeki | 323/284 |
| 2008/0100274 A1* | 5/2008 | Hayakawa | 323/284 |
| 2008/0197821 A1* | 8/2008 | Hasegawa et al. | 323/238 |
| 2008/0278129 A1* | 11/2008 | Shimizu | 323/282 |
| 2008/0290851 A1* | 11/2008 | Akashi et al. | 323/283 |
| 2009/0243579 A1* | 10/2009 | Lim et al. | 323/284 |
| 2010/0181981 A1* | 7/2010 | Takemura | 323/282 |
| 2010/0253297 A1* | 10/2010 | Tseng | 323/281 |
| 2012/0049829 A1* | 3/2012 | Murakami | 323/288 |

OTHER PUBLICATIONS

Office Action issued in U.S. Appl. No. 13/243,164, dated Jun. 17, 2013.

* cited by examiner

US 9,054,596 B2

DEVICE FOR SYNCHRONOUS DC-DC CONVERSION AND SYNCHRONOUS DC-DC CONVERTER

CROSS-REFERENCE TO RELATED APPLICATION

This application is a Divisional of U.S. application Ser. No. 13/243,164 filed on Sep. 23, 2011, now U.S. Pat. Ser. No. 8,669,748, which claims priority to Japanese Patent Application No. 2010-233406 filed on Oct. 18, 2010, the disclosures of which including the specification, the drawings, and the claims are hereby incorporated by reference in their entirety.

BACKGROUND

The present disclosure relates to switching DC-DC converters supplying DC voltages to various electronic devices, and more particularly to start-up characteristics of DC-DC converters including synchronous rectifier circuits.

Switching DC-DC converters are used as power supply circuits of numerous electronic devices due to their high-efficiency power conversion characteristics. In general, DC-DC converters convert a DC input voltage to high frequency AC power by switching operation of a main switching transistor, apply the converted power to an inductor, rectify a voltage induced to the inductor by a rectifying means, smooth the induced voltage with an output capacitor, and output the smoothed voltage as a DC output voltage. The DC output voltage of a switching DC-DC converter increases with an increase in a duty ratio, which is a ratio of on-time to a switching period, of the main switching transistor. The control circuit detects a DC output voltage, and adjusts the duty ratio to stabilize the DC output voltage at a target voltage.

When a diode is used as a rectifying means, forward voltage drop causes power loss. Some synchronous rectifier circuits achieve high efficiency with reduced forward voltage drop of the diode by using a transistor such as a MOSFET as a rectifying means similar to the main switching transistor, and turning on the transistor during an off period of the main switching transistor, or at occurrence of a forward voltage during an off period. Such DC-DC converters have often a function called "soft start" of gradually increasing the duty ratio at start-up or gradually increasing a target value of the DC output voltage from 0 V to a target value in normal operation to reduce rapid rising of the output voltage at the start-up and inrush currents occurring accordingly.

In some synchronous rectifier DC-DC converters, a synchronous rectifying transistor is fixed to an off state at start-up. (See, for example, Japanese Patent Publication No. 2003-70238 and Japanese Patent Publication No. H11-220874.) Japanese Patent Publication No. 2003-70238 teaches reducing an overcurrent caused by discharging a residual voltage at an output via the synchronous rectifying transistor, when a voltage remains at the output at start-up in a charger in which a power supply such as a battery is coupled to an output of a DC-DC converter. Even if an overcurrent does not flow, a voltage remaining at the output at the start-up is advantageous in handling the problem that a DC output voltage drops at least once, since the synchronous rectifying transistor allows a current for discharging an output to flow. Japanese Patent Publication No. H11-220874 teaches that an inductor current flows in one direction toward an output at start-up, thereby reducing output oscillation at the start of the oscillation.

SUMMARY

When a synchronous rectifying transistor is off during the almost entire start-up time from power-on until an output voltage is stabilized, and the output voltage reaches a target value in an, e.g., unloaded state, there is the problem that overshoot occurring in the output voltage is not discharged and an overvoltage condition continues. Furthermore, the main purpose of soft start is to reduce rapid rising of an output voltage and an input inrush current occurring accordingly. When there is a voltage remaining at the output, the time for reaching the target value is clearly shortened. However, another problem is that the output voltage does not reach the target value until the time set by the soft start, regardless of the existence of the voltage remaining at the output.

In order to solve the problem, the present disclosure is advantageous in smoothly starting up a synchronous rectifier DC-DC converter having a soft-start function, regardless of the existence of a voltage remaining at an output.

An example DC-DC converter of the present disclosure transforms a DC input voltage to generate a DC output voltage by complementary switching control of a main switching transistor and a synchronous rectifying transistor. The DC-DC converter includes a soft-start circuit configured to generate a soft-start voltage rising from an initial voltage at start-up of the DC-DC converter; and a control circuit configured to control switching of the main switching transistor and the synchronous rectifying transistor based on the soft-start voltage to perform soft-start of the DC-DC converter. The control circuit brings both of the main switching transistor and the synchronous rectifying transistor to an off state, while the soft-start voltage is lower than the DC output voltage.

As such, the main switching transistor and the synchronous rectifying transistor are both in an off state, while the soft-start voltage is lower than the DC output voltage at the start-up of the DC-DC converter. Thus, when a voltage remains in the DC output voltage, the DC output voltage can be stabilized at the target voltage without discharging the residual voltage. Furthermore, when the DC output voltage reaches the target voltage, the synchronous rectifying transistor is in normal operation. Thus, the DC output voltage can be rapidly converged to the target voltage, even if output overshoot caused by unloaded start-up etc. or output oscillation in accordance with the output overshoot occurs.

Specifically, the control circuit includes an error amplifier configured to amplify an error between the DC output voltage and lower one of the soft-start voltage or a target voltage of the DC output voltage, a PWM circuit configured to generate a drive pulse having a duty ratio corresponding to an output of the error amplifier, a comparator configured to compare the soft-start voltage to the DC output voltage, and a logic circuit configured to perform logic operation of the drive pulse and an output signal of the comparator when an enable signal is active, and to generate a first control signal for controlling the main switching transistor and a second control signal for controlling the synchronous rectifying transistor. The logic circuit brings the first and second control signals to a logic level at which the main switching transistor and the synchronous rectifying transistor are both in an off state, when the output signal of the comparator is at a logic level indicating that the soft-start voltage is lower than the DC output voltage.

Alternatively, specifically, after the soft-start voltage has reached a target voltage of the DC output voltage, the soft-start circuit holds the soft-start voltage at the target voltage. The control circuit includes an error amplifier configured to amplify an error between the soft-start voltage and the DC output voltage, a PWM circuit configured to generate a drive pulse having a duty ratio corresponding to an output of the error amplifier, a comparator configured to compare the soft-start voltage to the DC output voltage, and a logic circuit configured to perform logic operation of the drive pulse and an output signal of the comparator, and to generate a first control signal for controlling the main switching transistor and a second control signal for controlling the synchronous rectifying transistor. The logic circuit brings the first and second control signals to a logic level at which the main switching transistor and the synchronous rectifying transistor are both in an off state, when the output signal of the comparator is at a logic level indicating that the soft-start voltage is lower than the DC output voltage.

Preferably, the control circuit controls switching of the main switching transistor, while holding the synchronous rectifying transistor in the off state, since the soft-start voltage becomes higher than the DC output voltage until the DC output voltage reaches a predetermined voltage lower than the target voltage. This smoothly raises the DC output voltage in a condition where the duty ratio is so small to control on-time of the main switching transistor.

Specifically, the DC-DC converter further includes a second comparator configured to compare the DC output voltage to a predetermined voltage lower than the target voltage. The logic circuit changes a logic level of the first control signal in accordance with the drive pulse, while holding the second control signal at a logic level at which the synchronous rectifying transistor is in an off state, when the output signal of the comparator is at a logic level indicating that the soft-start voltage is higher than the DC output voltage, and when an output signal of the second comparator is at a logic level indicating that the DC output voltage is lower than the predetermined voltage.

Preferably, the soft-start circuit raises the soft-start voltage with a steeper slope than that after the soft-start voltage becomes higher than the DC output voltage, while the soft-start voltage is lower than the DC output voltage. This shortens start-up time of the DC-DC converter without damaging the advantages of the soft-start function such as reduction in inrush currents.

DETAILED DESCRIPTION

First Embodiment

Figure 1:
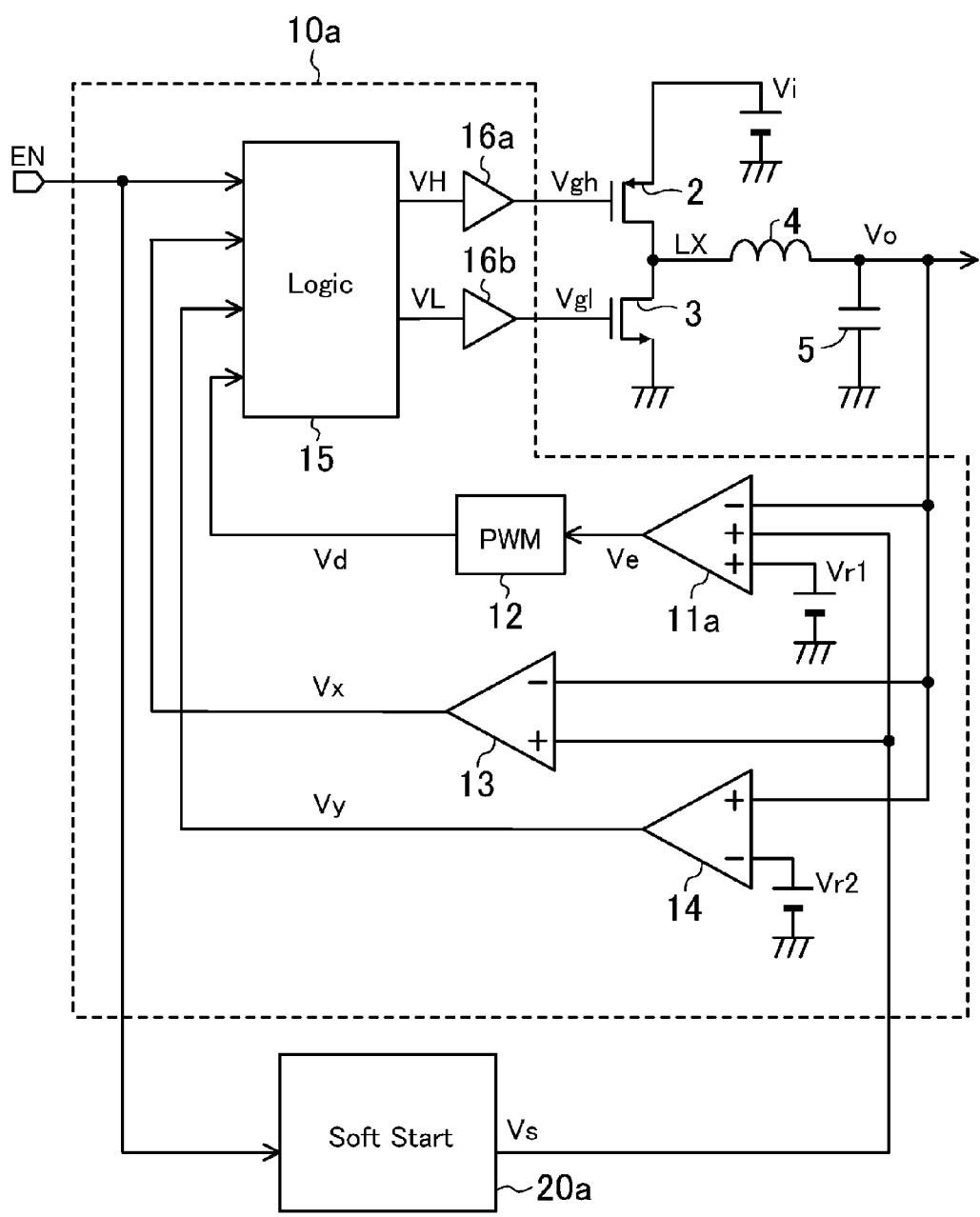
FIG. 1 is a circuit diagram of a DC-DC converter according to a first embodiment.

FIG. 1 illustrates a circuit configuration of a DC-DC converter according to a first embodiment. A main switching transistor 2 and a synchronous rectifying transistor 3 are coupled in series between a DC input voltage Vi and a ground. The main switching transistor 2 may be a p-channel MOSFET, and the synchronous rectifying transistor 3 may be an n-channel MOSFET. A first end of an inductor 4 is coupled at a connecting point of the main switching transistor 2 and the synchronous rectifying transistor 3. An output capacitor 5 is coupled between a second end of the inductor 4 and a ground.

With this configuration, complementary switching control of the main switching transistor 2 and the synchronous rectifying transistor 3 is performed, thereby applying a high frequency pulse voltage with a wave height Vi to the first end of the inductor 4. The high frequency pulse voltage is equalized by an LC filter including the inductor 4 and the output capacitor 5 and is output as a DC output voltage Vo. Where the duty ratio of the main switching transistor 2 is δ, Vo=δ×Vi is obtained. A control circuit 10a controls the duty ratio so that Vo stabilizes at a target voltage, and controls the main switching transistor 2 and the synchronous rectifying transistor 3.

In the control circuit 10a, Vo is coupled to an inverting input terminal of an error amplifier 11a, and a soft-start voltage Vs output from a soft-start circuit 20a and Vr1 which is a target voltage of Vo are coupled to two non-inverting input terminals of the error amplifier 11a. As will be described later, Vs is a voltage which rises from an initial voltage (e.g., a ground level) at start-up of the DC-DC converter. The error amplifier 11a amplifies an error between Vo and lower one of Vs and Vr1, and outputs an error signal Ve. A PWM circuit 12 generates a drive pulse Vd having a duty ratio corresponding to Ve. Specifically, the duty ratio δ of Vd increases with an increase in Ve, and decreases with a decrease in Ve. Vo is coupled to an inverting input terminal of a comparator 13. Vs is coupled to a non-inverting input terminal of the comparator 13. The comparator 13 compares Vs to Vo, and outputs a determination signal Vx as a comparison result. Note that the comparator 13 preferably has an offset voltage to bring Vx to an L level where Vo is higher than Vs by a small value or more. Vo is coupled to a non-inverting input terminal of a comparator 14. A predetermined voltage Vr2, which is lower than Vr1, is coupled to an inverting input terminal of the comparator 14. The comparator 14 compares Vo to Vr2, and outputs a determination signal Vy as a comparison result.

When an enable signal EN is active (e.g., at an H level), a logic circuit 15 performs logic operation of Vd, Vx, and Vy, and generates control signals VH and VL for controlling switching of the main switching transistor 2 and the synchronous rectifying transistor 3, respectively. For example, the main switching transistor 2 is in an on state when VH is at an L level, and is in an off state when VH is at an H level. The synchronous rectifying transistor 3 is in an on state when VL is at an H level, and is in an off state when VL is at an L level. Drive circuits 16a and 16b amplify power of VH and VL, respectively, and outputs a drive signal Vgh for driving the main switching transistor 2 and a drive signal Vgl for driving the synchronous rectifying transistor 3 so that the main switching transistor 2 and the synchronous rectifying transistor 3 are not in an on state at the same time.

Figure 2:
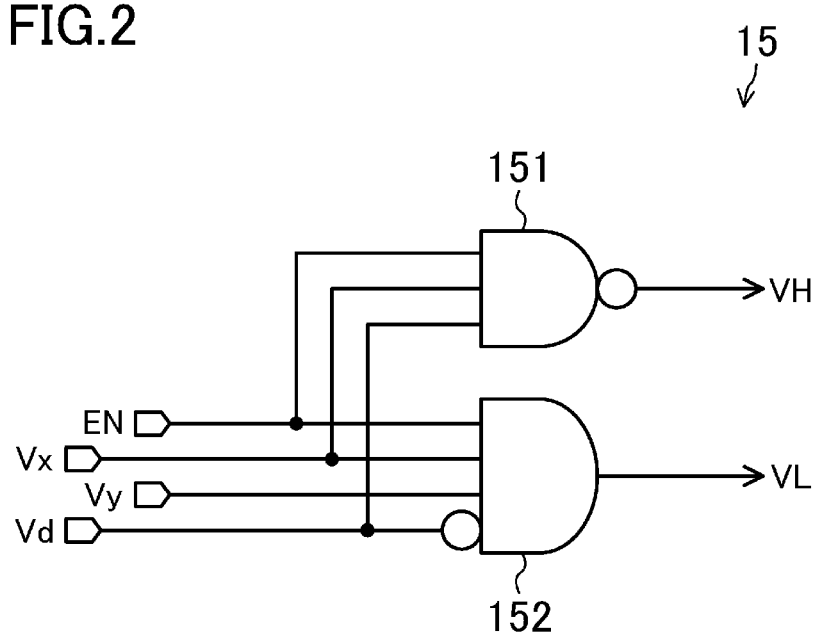
FIG. 2 is a circuit diagram of an example logic circuit.

The logic circuit 15 specifically operates as follows. When Vx is at a logic level (e.g. an L level) indicating that Vs is lower than Vo, the logic circuit 15 brings VH and VL to a logic level (e.g., VH to an H level, and VL to an L level) at which the main switching transistor 2 and the synchronous rectifying transistor 3 are both in an off state. Furthermore, when Vx is at a logic level (e.g. an H level) indicating that Vs is higher than Vo, and Vy is at a logic level (e.g. an L level) indicating that Vo is lower than Vr2, the logic circuit 15 changes the logic level of VH in accordance with Vd, while maintaining VL at a logic level (e.g. an L level) at which the synchronous rectifying transistor 3 is in an off state. Such logic operation is implemented variously. FIG. 2 illustrates an example configuration of the logic circuit 15. A NAND gate 151 outputs a result of NAND operation of EN, Vx, and Vd as VH. An AND gate 152 outputs a result of AND operation of inversion of EN, Vx, Vy, and Vd as VL.

Figure 3:
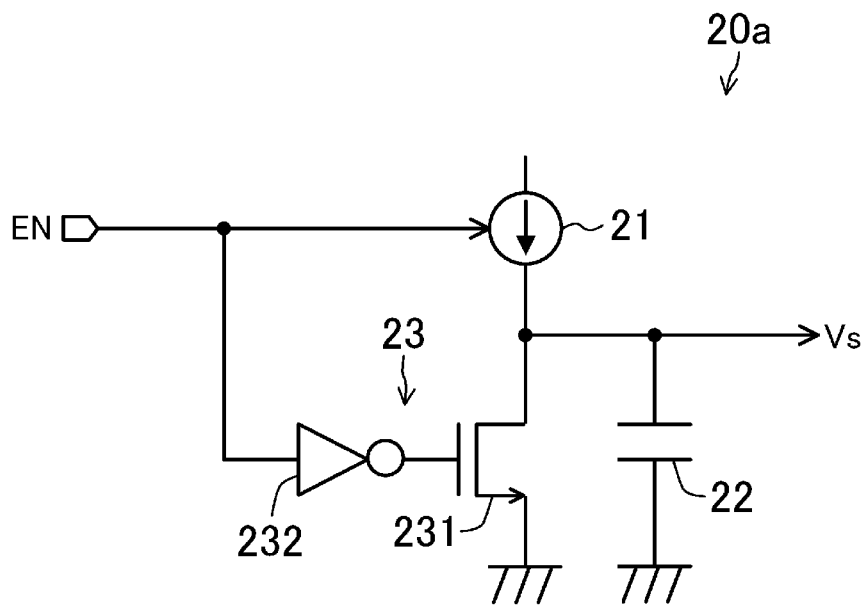
FIG. 3 is a circuit diagram of an example soft-start circuit.

Referring back to FIG. 1, the soft-start circuit 20a outputs Vs. When EN becomes an H level, the soft-start circuit 20a starts the operation and Vs starts to rise from the ground level. FIG. 3 illustrates an example configuration of the soft-start circuit 20a. When EN is at an H level, a constant current source 21 outputs a constant current. A capacitor 22 is coupled between the constant current source 21 and a ground. In addition, a switch circuit 23 is coupled to the capacitor 22 in parallel. The switch circuit 23 includes a switching transistor 231 which is an n-channel MOSFET, and an inverter circuit 232 performing logic inversion of EN. The switch circuit 23 becomes non-conductive when EN is at an H level, and becomes conductive when EN is at an L level. Therefore, when EN becomes an H level, the switch circuit 23 becomes non-conductive, the capacitor 22 is charged by a current output from the constant current source 21, and Vs gradually rises. On the other hand, when EN becomes an L level, the switch circuit 23 becomes conductive, and charge stored at the capacitor 22 is discharged.

Figure 4:
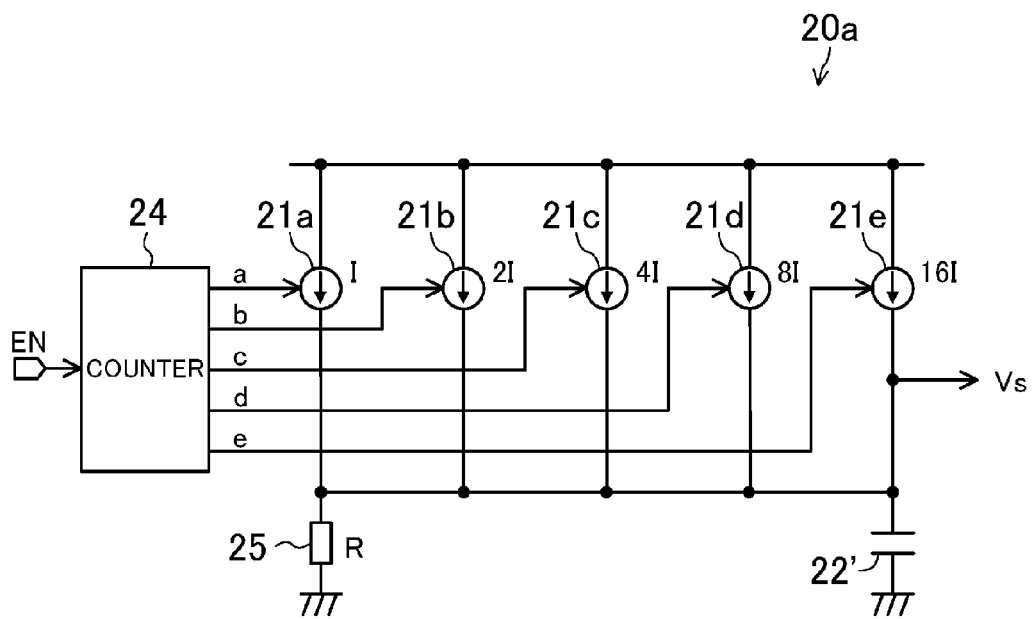
FIG. 4 is a circuit diagram of another example soft-start circuit.
Figure 5:
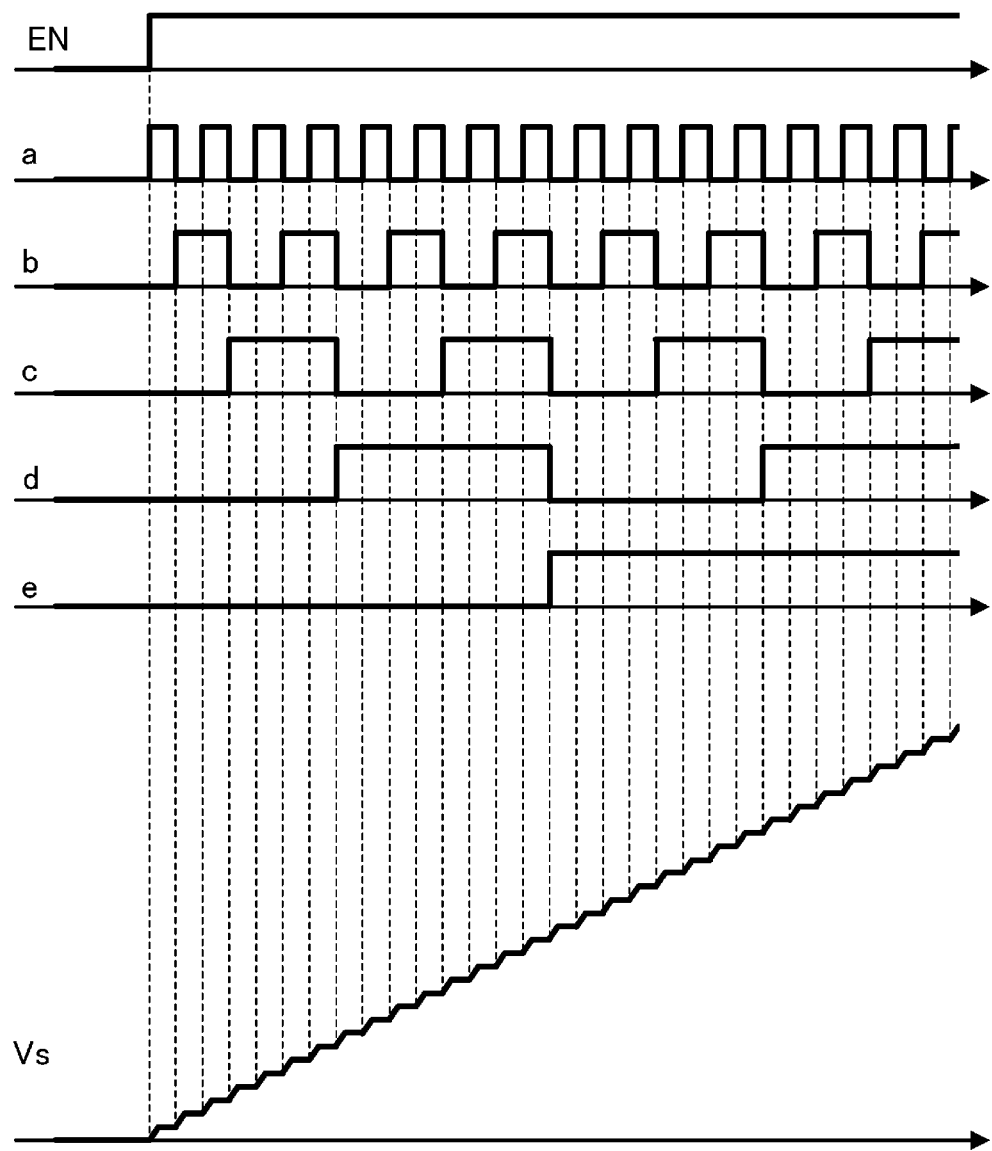
FIG. 5 is a timing chart of the soft-start circuit of FIG. 4.

Vs may rise stepwise. FIG. 4 illustrates another example configuration of the soft-start circuit 20a. When EN becomes an H level, a counter circuit 24 starts count operation. The counter circuit 24 is, for example, a 5-bit counter, and outputs signals a, b, c, d, and e, which control constant current sources 21a, 21b, 21c, 21d, and 21e, respectively. When the signals a-e are at an H level, the constant current sources 21a-21e output constant currents, respectively. Note that the current ratio of each of the constant current sources 21a-21e is set to power of two. A capacitor 22' is coupled to the constant current sources 21a-21e in common A resistive element 25 is coupled to the capacitor 22' in parallel. FIG. 5 is a timing chart of the soft-start circuit 20a of FIG. 4. Each time when a logic output value of a counter circuit 24 is incremented, the total current of the constant current sources 21a-21e increases by unit current I, and voltage drop of the resistive element 25, i.e., soft-start voltage Vs increases by R×I. Note that R is a resistance value of a resistive element.

The capacitor 22' is provided to mitigate a stepwise increase in Vs to smooth a slope of Vs, when the total current of the constant current sources 21a-21e increases, but may be omitted.

Then, operation of the DC-DC converter according to this embodiment at start-up will be described.

Figure 6:
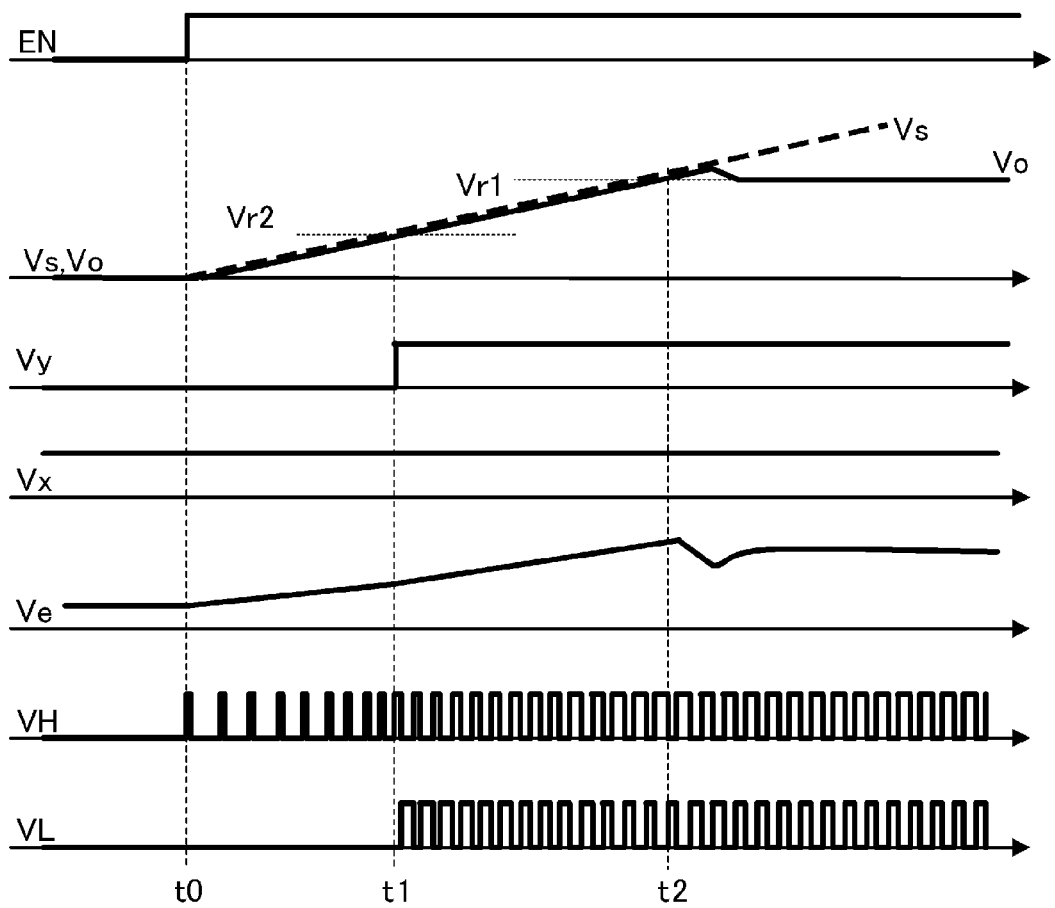
FIG. 6 is a timing chart of the first embodiment where a DC output voltage is at a ground level.

Case 1: Where Vo is at a Ground Level FIG. 6 is a timing chart where Vo is at a ground level. Until time t0, EN is at an L level, and Vo is 0 V. Vs is 0V, since the capacitor 22 is short-circuited by the switch circuit 23. Ve is initialized to a lower limit. Since Vo=0 V, Vx is at an H level, and Vy is at an L level. VH is at an H level, and VL is at an L level. The main switching transistor 2 and the synchronous rectifying transistor 3 are both in an off state.

When EN becomes an H level at time t0, the switch circuit 23 becomes non-conductive, and charge of the capacitor 22 starts to raise Vs. With the rise of Vs, Ve also rises, and the PWM circuit 12 outputs Vd. At this time, Vy is at an L level, and VL is thus at an L level. While the synchronous rectifying transistor 3 remains in an off state, only the main switching transistor 2 starts switching operation, and Vo follows Vs and rises. The synchronous rectifying transistor 3 is in an off state for the following reasons. The duty ratio is so small to control Vo which is a low voltage directly after start-up, and thus on-time control of the main switching transistor 2 is difficult. When the synchronous rectifying transistor 3 operates, on-time of the synchronous rectifying transistor 3 is long to discharge the output capacitor 5 too much so that Vo follows Vs, rises less smoothly, and oscillates. This condition continues until time t1 when Vo reaches Vr2. Vr2 is set so high to sufficiently control on-time of the main switching transistor 2, and to control Vo even when discharge of the output capacitor 5 by the synchronous rectifying transistor 3 is deducted.

When Vo reaches Vr2 at time t1, Vy becomes an H level, VL becomes a pulse output, and the synchronous rectifying transistor 3 starts switching operation. Vs continues to rise, and complementary switching control of the main switching transistor 2 and the synchronous rectifying transistor 3 is performed in accordance with Ve, thereby allowing Vo to follow Vs and rise.

When Vs and Vo reach Vr1 at time t2, a non-inverting input of the error amplifier 11a is changed to Vr1. That is, the target value of Vo is changed from Vs to Vr1. However, Vo becomes higher than Vr1 due to delay in the error amplifier 11a and the PWM circuit 12. When, the synchronous rectifying transistor 3 is fixed to an off state as is conventionally done, Vo remains in an overvoltage condition in an unloaded state or in a light-loaded state close to the unloaded state. By contrast, in this embodiment, the synchronous rectifying transistor 3 discharges the output capacitor 5, thereby rapidly reducing the overshoot voltage to stabilize Vo at Vr1.

Case 2: Where a Low Voltage Remains in Vo.

Figure 7:
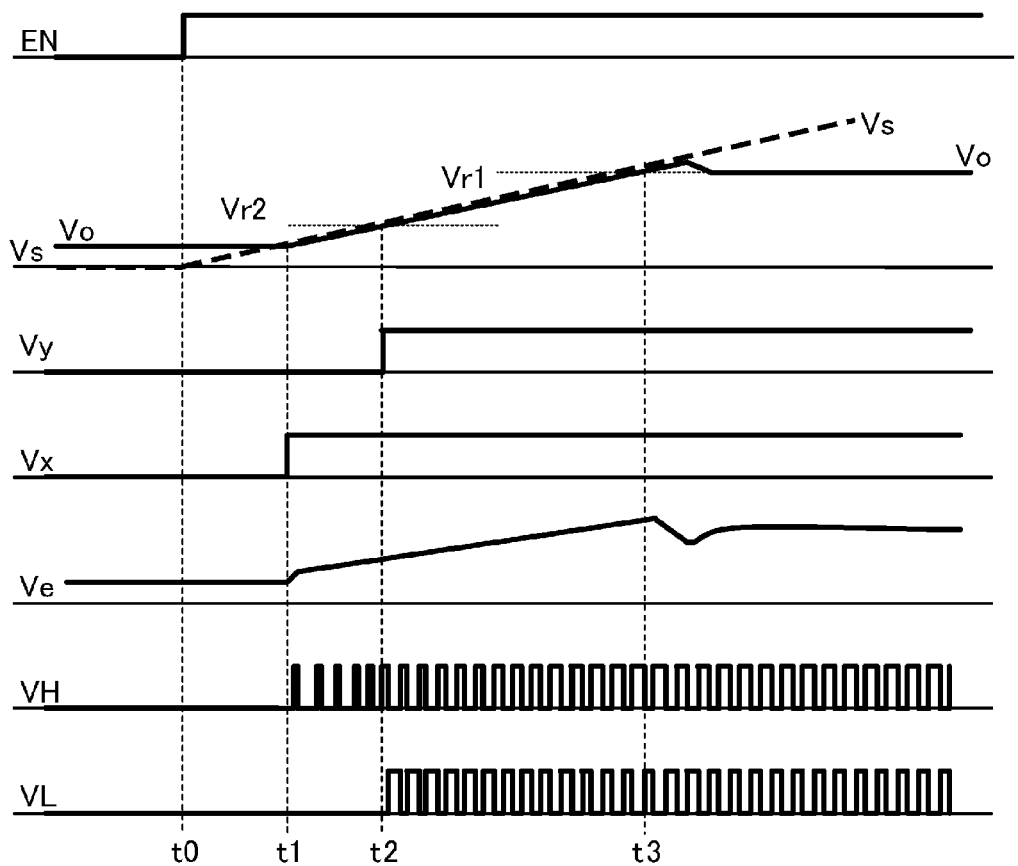
FIG. 7 is a timing chart of the first embodiment where a low voltage remains in the DC output voltage.

FIG. 7 is a timing chart where a low voltage remains in Vo. Until time t0, EN is at an L level, and a voltage higher than the ground level and lower than Vr2 remains in Vo. Vs is 0V, since the capacitor 22 is short-circuited by the switch circuit 23. Ve is initialized to a lower limit Since Vo>Vs, Vx is at an L level. Since Vo<Vr2, Vy is at an L level. VH is at an H level, and VL is at an L level. The main switching transistor 2 and the synchronous rectifying transistor 3 are both in an off state.

When EN becomes an H level at time t0, the switch circuit 23 becomes non-conductive, and charge of the capacitor 22 starts to raise Vs. However, a low voltage remains in Vo, and thus, Vx remains at an L level, VH remains at an H level, and VL remains at an L level. That is, the main switching transistor 2 and the synchronous rectifying transistor 3 are both in an off state. This condition continues until time t1 when Vs becomes higher than Vo.

When Vs becomes higher than Vo at time t1, Vx becomes an H level, and VH becomes a pulse output. On the other hand, since Vo<Vr2, Vy remains at an L level, and VL remains at an L level. Therefore, the synchronous rectifying transistor 3 remains in an off state, only the main switching transistor 2 starts switching operation, and Vo follows Vs and rises.

When Vo reaches Vr2 at time t2, Vy becomes an H level, VL becomes pulse output, and the synchronous rectifying transistor 3 also starts switching operation. Vs continues to rise, and complementary switching control of the main switching transistor 2 and the synchronous rectifying transistor 3 is performed in accordance with Ve, thereby allowing Vo to follow Vs and rise. The operation after that, i.e., after Vs and Vo reach Vr1 at time t3 is as described above.

Case 3: Where a High Voltage Remains in Vo.

Figure 8:
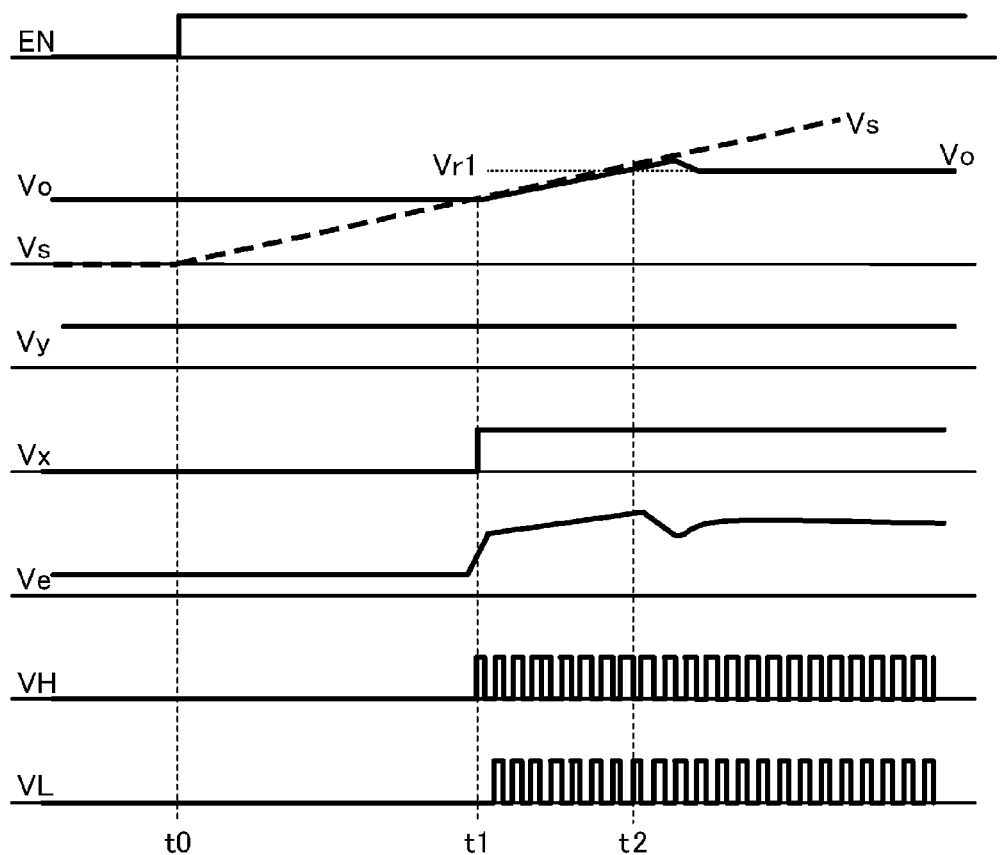
FIG. 8 is a timing chart of the first embodiment where a high voltage remains in the DC output voltage.

FIG. 8 is a timing chart where a high voltage remains in Vo. Until time t0, EN is at an L level, and a voltage higher than Vr2 remains in Vo. Vs is 0V, since the capacitor 22 is short-circuited by the switch circuit 23. Ve is initialized to a lower limit. Since Vo>Vs, Vx is at an L level. Since Vo>Vr2, Vy is at an H level. VH is at an H level, and VL is at an L level. The main switching transistor 2 and the synchronous rectifying transistor 3 are both in an off state.

When EN becomes an H level at time t0, the switch circuit 23 becomes non-conductive, charge of the capacitor 22 starts to raise Vs. However, since a high voltage remains in Vo, Vx remains at an L level, VH remains at an H level, and VL remains at an L level. That is, the main switching transistor 2 and the synchronous rectifying transistor 3 are both in an off state. This condition continues until time t1 when Vs becomes higher than Vo.

When Vs becomes higher than Vo at time t1, Vx becomes an H level, and VH and VL are both pulse outputs. As a result, complementary switching control of the main switching transistor 2 and the synchronous rectifying transistor 3 is performed in accordance with Ve, thereby allowing Vo to follow Vs and rise. The operation after that, i.e., after Vs and Vo reach Vr1 at time t2 is as described above.

As described above, according to this embodiment, when a voltage remains in a DC output voltage at start-up, switching control of a synchronous rectifying transistor is stopped to raise the DC output voltage to a target voltage without discharging a residual voltage. When the DC output voltage reaches the target voltage, the DC output voltage can be rapidly converged to the target voltage, even if output overshoot caused by unloaded start-up etc. or output oscillation in accordance with the output overshoot occurs, since a synchronous rectifying transistor operates.

Second Embodiment

Figure 9:
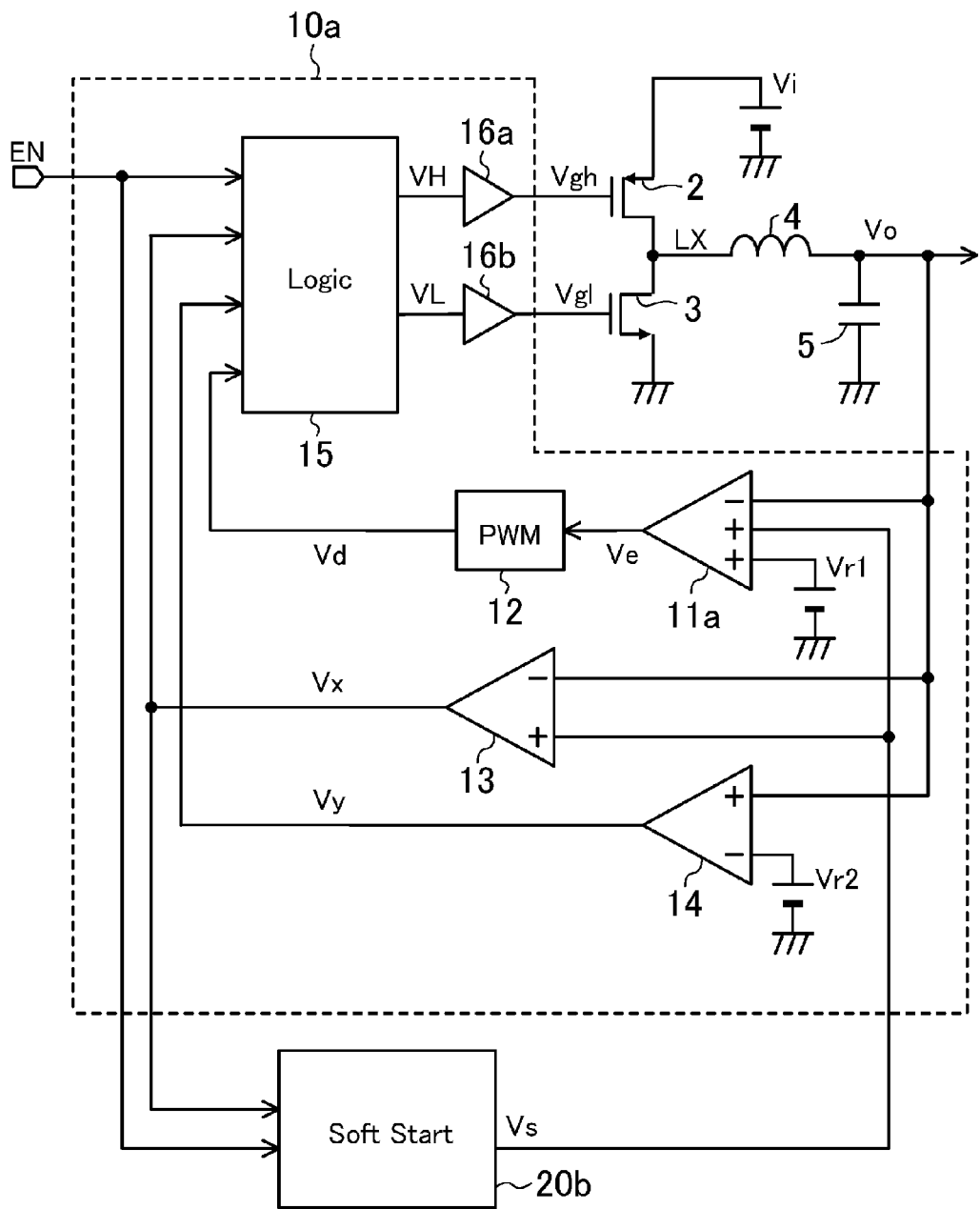
FIG. 9 is a circuit diagram of a DC-DC converter of a second embodiment.

FIG. 9 illustrates a circuit configuration of a DC-DC converter according to the second embodiment. The DC-DC converter according to this embodiment includes a soft-start circuit 20b having a different configuration from that of the first embodiment. The differences from the first embodiment will be described below.

In the first embodiment, even when a high voltage remains in Vo at start-up of the DC-DC converter, the main switching transistor 2 and the synchronous rectifying transistor 3 are both in an off state until Vs becomes higher than Vo after rising from 0V (see FIG. 8). Thus, when Vs has a gentle rising slope, start-up time may become longer. Therefore, while Vs is lower than Vo, the soft-start circuit 20b raises Vs with a steeper slope than that after Vs becomes higher than Vo.

Figure 10:
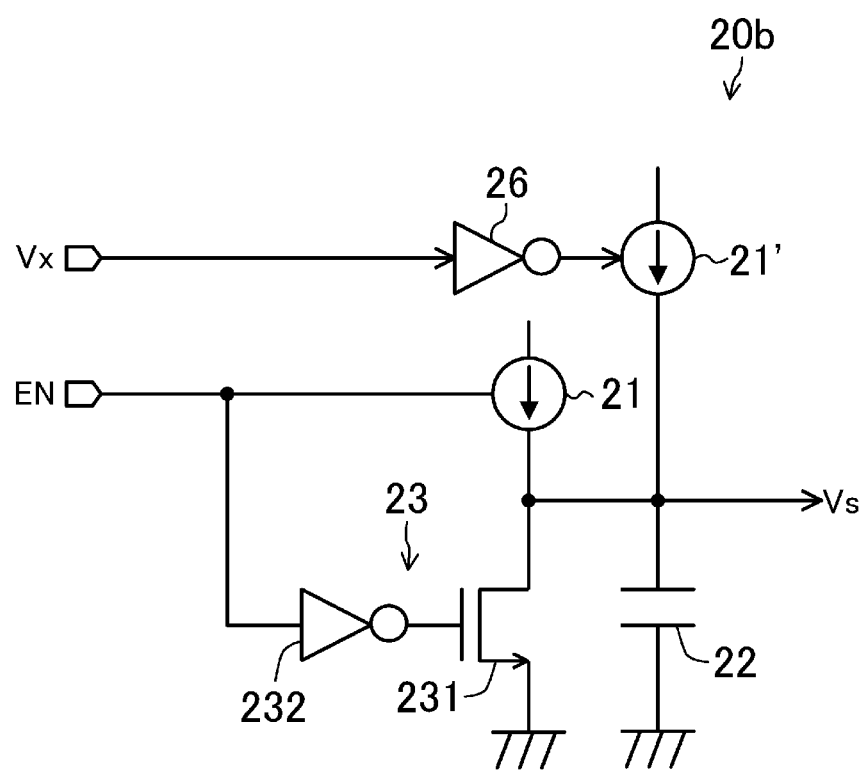
FIG. 10 is a circuit diagram of an example soft-start circuit.

FIG. 10 illustrates an example configuration of the soft-start circuit 20b. The soft-start circuit 20b is similar to the soft-start circuit 20a of FIG. 3, but a second constant current source 21' and an inverter circuit 26 are added. The inverter circuit 26 outputs logical inversion of Vx. The second constant current source 21' is controlled by an output of the inverter circuit 26. Specifically, Vx is at an L level, and the second constant current source 21' supplies a current to the capacitor 22.

Figure 11:
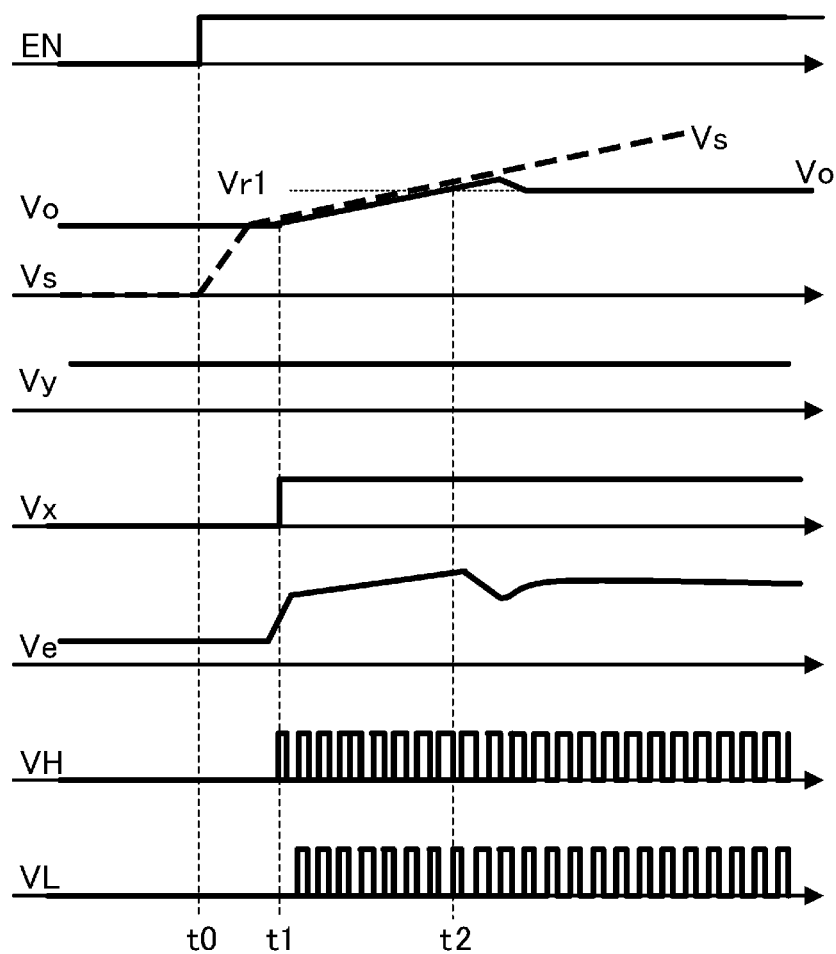
FIG. 11 is a timing chart of a second embodiment where a high voltage remains in the DC output voltage.

FIG. 11 is a timing chart where a high voltage remains in Vo. While Vx is at an L level, Vs rises with a steeper slope than that after Vx becomes an H level. Thus, as compared to the timing chart of FIG. 8, the period from the time when EN becomes an H level to the time when Vs becomes higher than Vo is shortened.

As described above, according to this embodiment, when a voltage remains in a DC output voltage, start-up time of the DC-DC converter is shortened while achieving the intended objective of soft start such as reduction in an inrush current at the start-up.

Note that, although it is not shown in the figure, the soft-start circuit 20a of FIG. 4 also changes Vs as shown in FIG. 11 by reducing the output period of the counter circuit 24 while Vx is at an L level as compared to that while Vx is at an H level.

Third Embodiment

Figure 12:
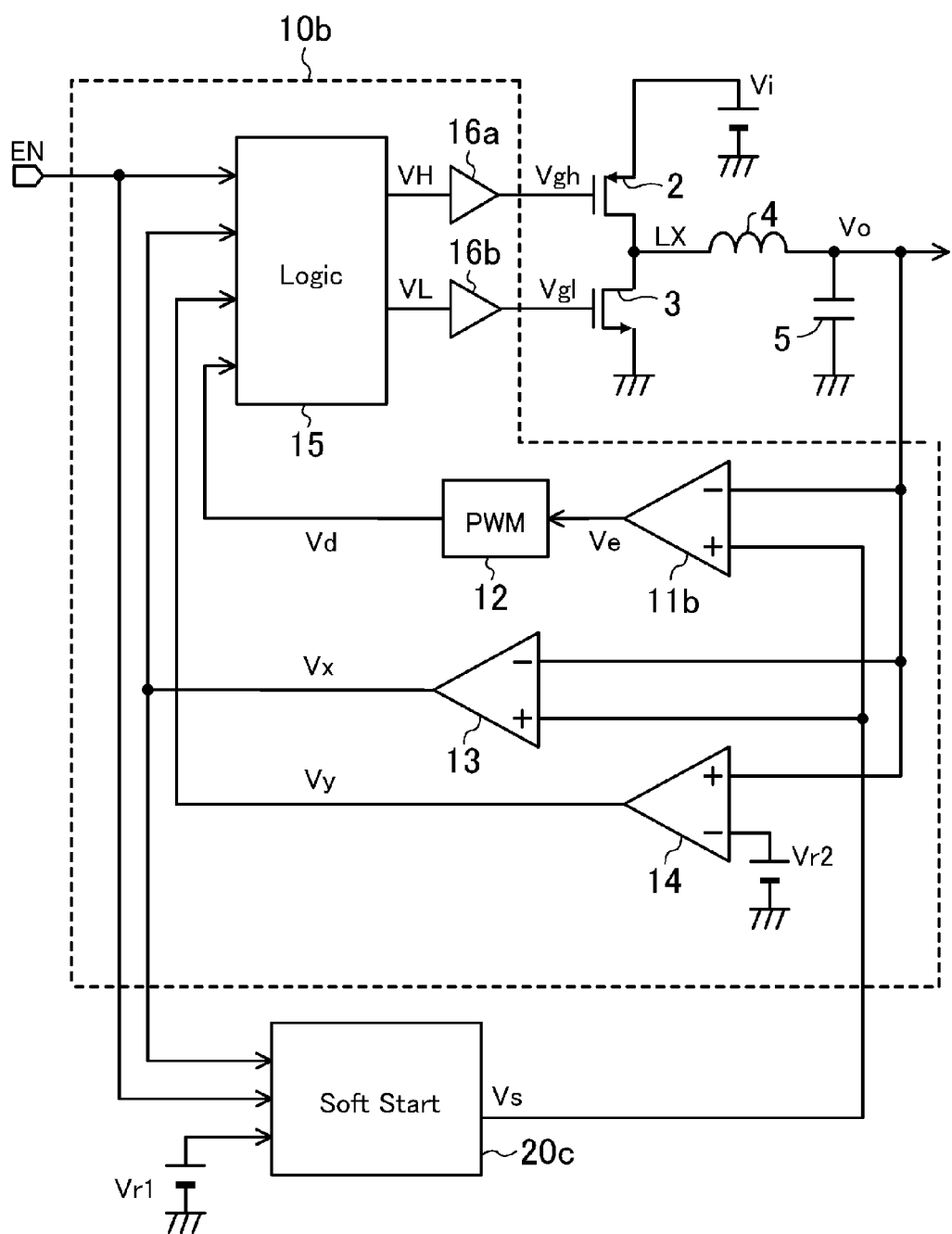
FIG. 12 is a circuit diagram of a DC-DC converter of a third embodiment.

FIG. 12 illustrates a configuration of a DC-DC converter according to a third embodiment. The DC-DC converter according to this embodiment includes a control circuit 10b and a soft-start circuit 20c which have different configurations from those in the first and second embodiments. The differences from the first and second embodiments will be described below.

The control circuit 10b includes a conventional 2-input error amplifier 11b in place of the error amplifier 11a of the first and second embodiments. Vo is coupled to an inverting input terminal of the error amplifier 11b. Vs is coupled to a non-inverting input terminal of the error amplifier 11b. The error amplifier 11b amplifies an error between Vs and Vo, and outputs an error signal Ve. Other configurations are similar to those in the first and second embodiments.

Figure 13:
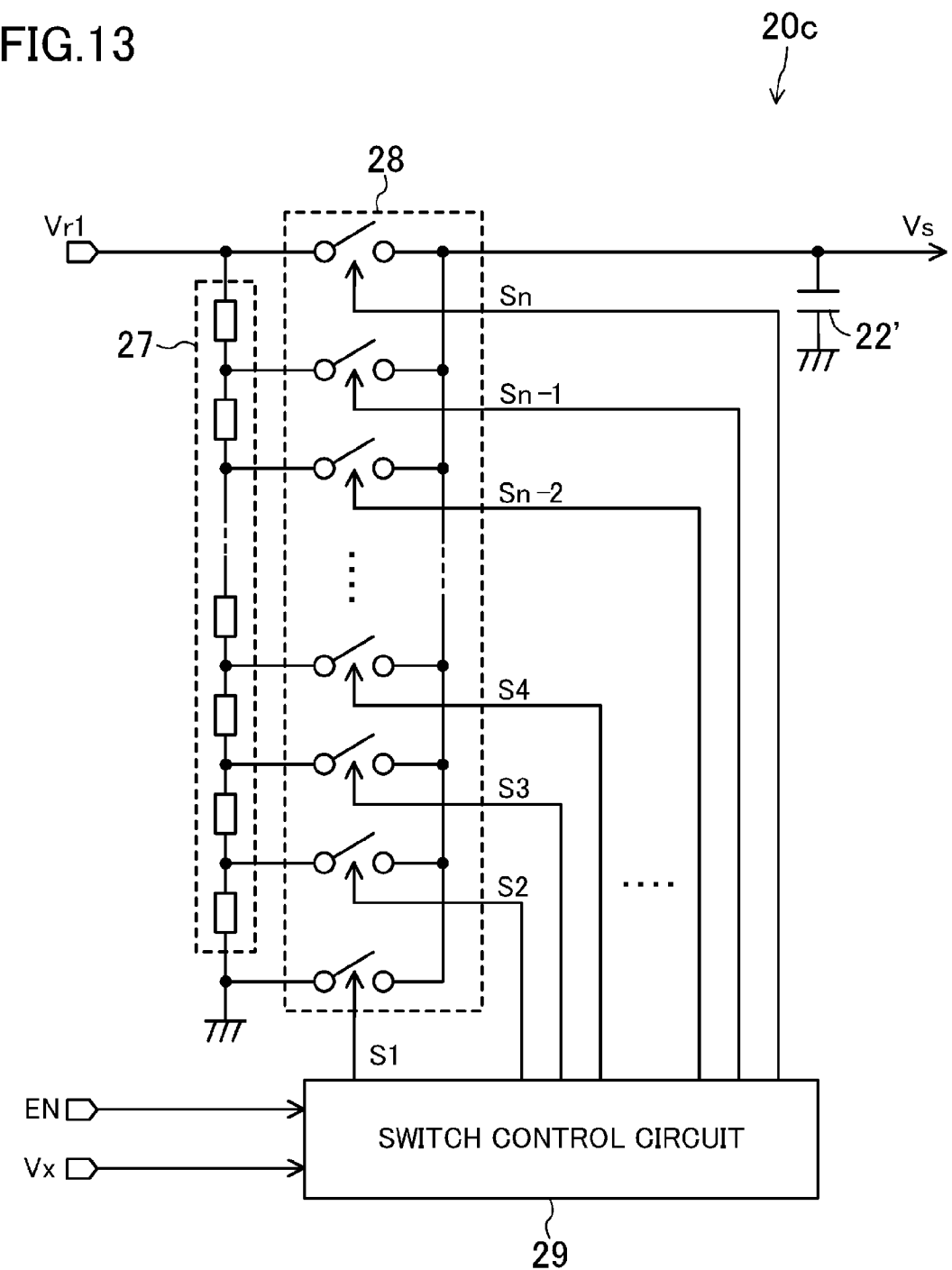
FIG. 13 is a circuit diagram of an example soft-start circuit.

Similar to the soft-start circuits 20a and 20b, the soft-start circuit 20c raises Vs from a ground level at start-up of the DC-DC converter. In addition, the soft-start circuit 20c has the function of holding Vs at Vr1 after Vs reaches Vr1. FIG. 13 illustrates an example configuration of the soft-start circuit 20c. A resistor ladder circuit 27 is coupled between Vr1 and a ground. Resistive elements included in the resistor ladder circuit 27 have equal resistance values. An end of a switch group 28 is coupled to nodes of the resistor ladder circuit 27. The other end of the switch group 28 is coupled to the capacitor 22'. When EN becomes an H level, a switch control circuit 29 sequentially outputs one-shot pulse signals S2, S3, . . . , Sn−1 to sequentially perform on-control of switches of the switch group 28 from the switch with lower potential. Furthermore, when Vx is at an L level, the switch control circuit 29 reduces a one-shot pulse width.

Figure 14:
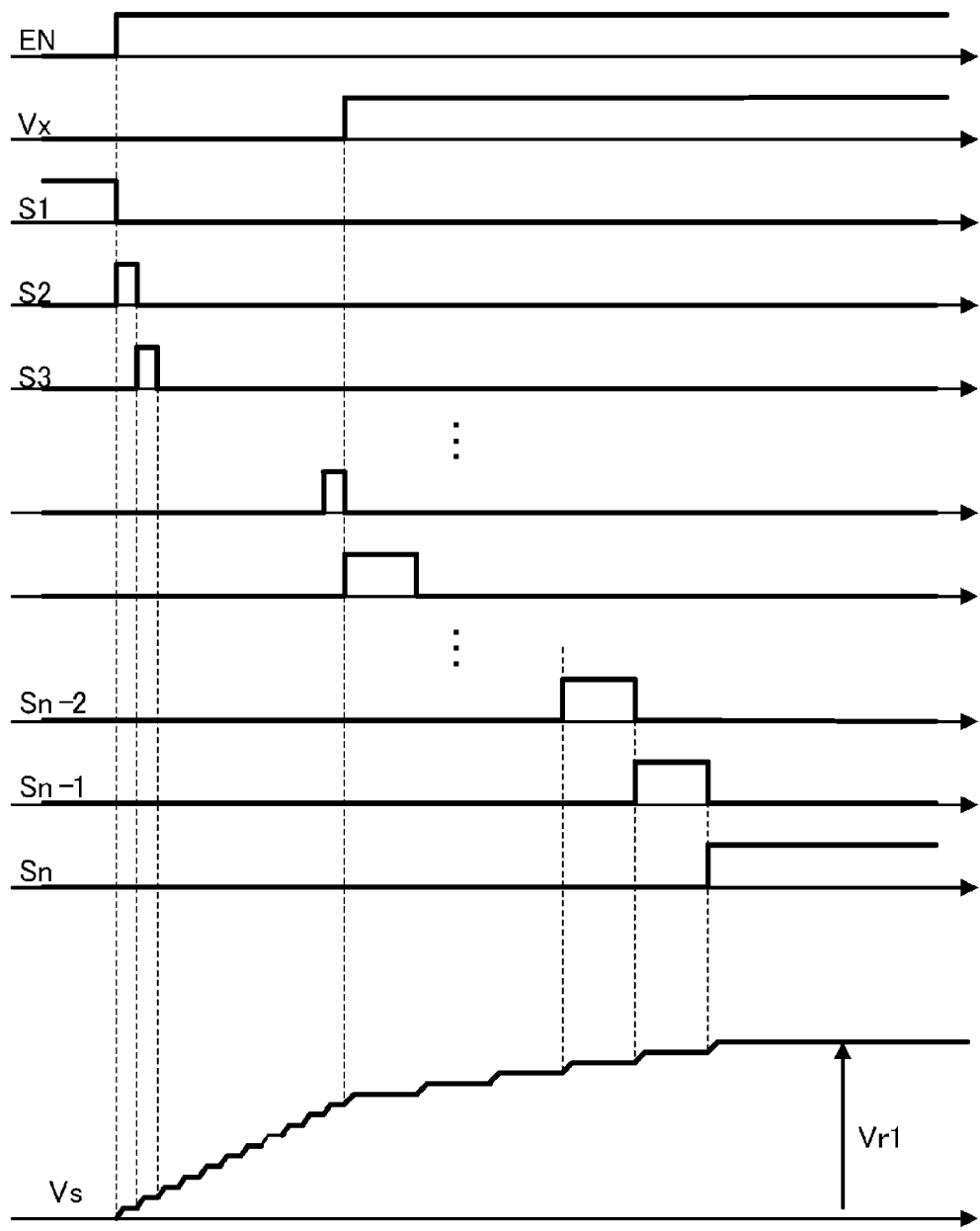
FIG. 14 is a timing chart of the soft-start circuit of FIG. 13.

FIG. 14 is a timing chart of the soft-start circuit 20c of FIG. 13. While EN is at an L level, only S1 is at an H level, and Vs is 0 V. When EN becomes an H level, S2, S3, . . . , are sequentially output. Furthermore, when Vx is at an L level, a one-shot pulse with a pulse width, which is shorter than that when Vx is at an H level, is output. This raises Vs with a relatively steep slope while Vx is at an L level. When an output signal of the switch control circuit 29 is changed, the capacitor 22' mitigates a stepwise increase in Vs to smooth the slope of Vs. Vs rises, and eventually, only Sn is held at an H level. As a result, Vs is hold at Vr1. Note that the capacitor 22' may be omitted.

As described above, according to this embodiment, a DC output voltage follows a soft-start voltage and is smoothly and rapidly stabilized at a target voltage, regardless of whether or not a voltage remains in a DC output voltage at start-up of a DC-DC converter, and even in an unloaded or light-loaded condition.

While buck converters have been described as various embodiments of the present disclosure, the present disclosure is not limited thereto. The present disclosure is also applicable to boost converters and buck-boost converters including a synchronous rectifying transistor.

What is claimed is:

1. A device for DC-DC conversion transforming a DC input voltage to generate a DC output voltage, the device comprising:
  a main switching transistor connected between a power input terminal and a switch node;

a synchronous rectifying transistor connected between a ground and the switch node;
a soft-start circuit generating a soft-start voltage rising from an initial voltage at start-up of the DC-DC conversion; and
a control circuit which includes a comparator having a first input terminal and a second input terminal, the first input terminal sensing a voltage based on a voltage of the switch node and the second input terminal connected to the soft-start circuit, the control circuit controlling switching of the main switching transistor and the synchronous rectifying transistor based on a voltage at the first input terminal and a voltage at the second input terminal,
wherein the control circuit holds both of the main switching transistor and synchronous rectifying transistor in an off state based on an output signal of the comparator while the voltage at the second input terminal is lower than or equal to the voltage at the first input terminal.

2. The device of claim 1, wherein the control circuit controls to start switching of the main switching transistor when the voltage at the second input terminal exceeds the voltage at the first input terminal, and holds the synchronous rectifying transistor in an off state until the main switching transistor starts switching.

3. The device of claim 1, wherein
the soft-start circuit raises the voltage at the second input terminal with a first slope while the voltage at the second input terminal is lower than the voltage at the first input terminal,
the soft-start circuit raises the voltage at the second input terminal with a second slope after the voltage at the second input terminal becomes higher than the voltage at the first input terminal, and
the first slope is steeper than the second slope.

4. The device of claim 1, wherein the control circuit further includes a three-input error amplifier having a third input terminal connected to the switch node, a fourth input terminal connected to the soft-start circuit and a fifth input terminal to which a reference voltage is input.

5. The device of claim 4, wherein the soft-start circuit includes:
a capacitor,
a constant current source supplying a current to the capacitor when an enable signal is active, and
a switch circuit coupled to the capacitor in parallel, and becoming non-conductive when the enable signal is active.

6. The device of claim 4, wherein the soft-start circuit includes:
a counter circuit starting count operation when an enable signal becomes active,
a plurality of constant current sources controlled with an output signal of the counter circuit, and
a resistive element coupled to the plurality of constant current sources in common.

7. The device of claim 4, wherein the three-input error amplifier is configured to amplify an error between the voltage at the third input terminal and lower one of the voltage at the fourth input terminal or the reference voltage.

8. The device of claim 4, wherein the reference voltage corresponds to a target voltage of the DC output voltage.

9. The device of claim 1, wherein after the soft-start voltage has reached a target voltage of the DC output voltage, the soft-start circuit holds the soft-start voltage at the target voltage.

10. The device of claim 9, wherein the soft-start circuit includes:
a capacitor,
a resistor ladder circuit coupled between the target voltage and a ground,
a switch group including a plurality of switches between the capacitor and nodes of the resistor ladder circuit, and
a switch control circuit performing on-control of the plurality of switches of the switch group.

11. The device of claim 1, wherein the first input terminal is connected to the switch node via a passive element for transforming a voltage at the switch node to the DC output voltage.

12. A DC-DC converter comprising:
a main switching transistor connected between a power input terminal and a switch node;
a synchronous rectifying transistor connected between a ground and the switch node; and
a control circuit having a first input terminal sensing a voltage based on a voltage of the switch node and a second input terminal for receiving a soft-start voltage rising from an initial voltage at start-up of the DC-DC converter, the control circuit controlling switching of the main switching transistor and the synchronous rectifying transistor based on a voltage at the first input terminal and a voltage at the second input terminal,
wherein the control circuit holds both of the main switching transistor and synchronous rectifying transistor in an off state based on a signal generated in the control circuit internally from a beginning of start-up of the DC-DC conversion until the voltage at the second input terminal exceeds the voltage at the first input terminal.

13. The DC-DC converter of claim 12, wherein the control circuit controls to start switching of the main switching transistor when the voltage at the second input terminal exceeds the voltage at the first input terminal, and holds the synchronous rectifying transistor in an off state until the main switching transistor starts switching.

14. The DC-DC converter of claim 12, wherein the first input terminal is connected to the switch node via a passive element for transforming a voltage at the switch node to a DC output voltage.

15. The DC-DC converter of claim 12, further comprising a soft-start circuit generating the soft-start voltage.

16. The DC-DC converter of claim 15, wherein
the soft-start circuit raises the voltage at the second input terminal with a first slope while the voltage at the second input terminal is lower than the voltage at the first input terminal,
the soft-start circuit raises the voltage at the second input terminal with a second slope after the voltage at the second input terminal becomes higher than the voltage at the first input terminal, and
the first slope is steeper than the second slope.

17. The DC-DC converter of claim 12, wherein the control circuit includes a three-input error amplifier having a third input terminal connected to the switch node, a fourth input terminal for receiving the soft-start voltage at start-up of the DC-DC converter and a fifth input terminal to which a reference voltage is input.

18. The DC-DC converter of claim 17, wherein the reference voltage corresponds to a target voltage for the DC-DC converter.

19. The DC-DC converter of claim 17, wherein the three-input error amplifier is configured to amplify an error between the voltage at the third input terminal and lower one of the voltage at the fourth input terminal or the reference voltage.

20. The DC-DC converter of claim 12, wherein the control circuit controls switching of the main switching transistor while holding the synchronous rectifying transistor in an off state since the voltage at the second input terminal becomes higher than the voltage at the first input terminal until the voltage at the first input terminal reaches a predetermined voltage lower than a target voltage.

21. A device for DC-DC conversion transforming a DC input voltage to generate a DC output voltage, the device comprising:
- a main switching transistor connected between a power input terminal and a switch node;
- a synchronous rectifying transistor connected between a ground and the switch node;
- a soft-start circuit controlling a slope of the DC output voltage at start-up of the DC-DC conversion; and
- a control circuit sensing a voltage based on a voltage of the switch node, the control circuit controlling switching of the main switching transistor and the synchronous rectifying transistor based the voltage based on a voltage of the switch node,
- wherein both of the main switching transistor and the synchronous rectifying transistor do not turn on from a beginning of start-up of the DC-DC conversion until an internal voltage which ramps up at start-up of the DC-DC conversion exceeds the DC output voltage being pre-biased at the beginning of start-up of the DC-DC conversion.

22. The device of claim 21, wherein the control circuit controls to start switching of the main switching transistor when the internal voltage exceeds the DC output voltage being pre-biased at a beginning of start-up of the DC-DC conversion.

23. The device of claim 21, wherein a first input terminal is connected to the switch node via a passive element for transforming a voltage at the switch node to the DC output voltage.

24. The device of claim 21, further comprising the soft-start circuit generating the internal voltage.

25. The device of claim 21, wherein
- the soft-start circuit raises the internal voltage with a first slope while the internal voltage is lower than the DC output voltage being pre-biased at a beginning of start-up of the DC-DC conversion,
- the soft-start circuit raises the internal voltage with a second slope after the internal voltage becomes higher than the DC output voltage being pre-biased at a beginning of start-up of the DC-DC conversion, and
- the first slope is steeper than the second slope.

* * * * *